US009195567B1

(12) United States Patent
Blackman et al.

(10) Patent No.: US 9,195,567 B1
(45) Date of Patent: Nov. 24, 2015

(54) DEBUGGING DATA FORMAT CONVERSION

(71) Applicant: International Business Machines Corporation, Armonk, NY (US)

(72) Inventors: Jeremy P. Blackman, Mullaloo (AU); Bret W. Dixon, South Perth (AU); Adrian N. Simcock, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/279,865

(22) Filed: May 16, 2014

(51) Int. Cl.
*G06F 9/45* (2006.01)
*G06F 11/36* (2006.01)

(52) U.S. Cl.
CPC .......... *G06F 11/3624* (2013.01); *G06F 11/362* (2013.01); *G06F 11/3636* (2013.01)

(58) Field of Classification Search
CPC G06F 11/362; G06F 11/3636; G06F 11/3624
See application file for complete search history.

(56) References Cited

U.S. PATENT DOCUMENTS

| 7,590,975 | B1 | 9/2009 | Shapiro | |
|---|---|---|---|---|
| 7,773,005 | B2* | 8/2010 | Frank | 341/67 |
| 8,429,632 | B1* | 4/2013 | Coutant et al. | 717/151 |
| 8,458,681 | B1* | 6/2013 | Coutant et al. | 717/151 |
| 8,677,322 | B2 | 3/2014 | Agarwal et al. | |
| 8,732,681 | B2* | 5/2014 | Sale et al. | 717/140 |
| 2011/0029953 | A1 | 2/2011 | Pouyollon et al. | |
| 2012/0030660 | A1 | 2/2012 | McGrath | |
| 2012/0159444 | A1 | 6/2012 | Agarwal et al. | |
| 2013/0117542 | A1 | 5/2013 | Filachek et al. | |
| 2014/0033181 | A1* | 1/2014 | Wang et al. | 717/129 |
| 2014/0074840 | A1* | 3/2014 | Wada et al. | 707/737 |
| 2015/0106572 | A1* | 4/2015 | Stone et al. | 711/147 |

OTHER PUBLICATIONS

DWARF Debugging Information Format—Version 4, UNIX International, Inc., Jun. 2010, 325 pages.*
M. Eager, Introduction to the DWARF Debugging Format, Apr. 2012, 11 pages.*
U.S. Appl. No. 14/602,654, filed Jan. 22, 2015; Entitled "Debugging Data Format Conversion".
List of IBM Patents or Patent Applications Treated as Related, dated Jan. 22, 2015.

* cited by examiner

*Primary Examiner* — Thuy Dao
(74) *Attorney, Agent, or Firm* — Edward J. Wixted, III

(57) ABSTRACT

In an approach for generating a compiler listing using Debugging With Attributed Record Format (DWARF) debugging data, a processor receives DWARF debugging data associated with source code of a programming language. A processor extracts information from the DWARF debugging data, wherein the information comprises at least source code lines, variable declaration lines, and variable reference lines. A processor generates a compiler listing based on the information extracted from the DWARF debugging data, wherein the compiler listing includes at least a symbol table, and cross-reference information.

11 Claims, 3 Drawing Sheets

DEBUGGING DATA FORMAT CONVERSION

FIELD OF THE INVENTION

The present invention relates generally to the field of debugging software, and more particularly to generating a compiler listing using DWARF debugging data format information.

BACKGROUND OF THE INVENTION

A debugging data format is a means of storing information about a compiled program for use by high-level debuggers. Modern debugging data formats may store enough information to allow source-level debugging. The Debugging With Attribute Record Format (DWARF) and symbol table entries (STABS) formats are the most widely used executable and linking format (ELF). Other debugging formats include common object file format (COFF), PE-COFF, object module format (OMF), and IEEE-695.

DWARF is a more recent format for ELF files. DWARF was created to overcome shortcomings in STAB, allowing for more detailed and compact descriptions of data structures, data variable movement, and complex language structures, such as in C. The debugging information is stored in sections in the object file.

The basic descriptive entity in DWARF is the debugging information entry (DIE). A DIE has a tag that specifies what the DIE describes and a list of attributes that fills in details, and further describes the entity. Attributes may contain a variety of values: constants (such as a function name), variables (such as the start address for a function), or references to another DIE (such as for the type of a function's return value).

SUMMARY

Aspects of an embodiment of the present invention disclose a method, computer program product, and computing system for generating a compiler listing using Debugging With Attributed Record Format (DWARF) debugging data. A processor receives DWARF debugging data associated with source code of a programming language. A processor extracts information from the DWARF debugging data, wherein the information comprises at least source code lines, variable declaration lines, and variable reference lines. A processor generates a compiler listing based on the information extracted from the DWARF debugging data, wherein the compiler listing includes at least a symbol table, and cross-reference information.

DETAILED DESCRIPTION

Embodiments of the present invention recognize that many modern compilers have moved to a standardized debugging data format called DWARF. Embodiments of the present invention recognize that not all modern debuggers support the DWARF debugging data format. Embodiments of the present invention propose a method, computer program product, and computer system that allows for the conversion of DWARF debugging data into a compiler listing. A compiler listing is a type of compiler output that contains information about a particular compilation. As a debugging aid, a compiler listing is useful for determining what has gone wrong in a compilation.

The present invention will now be described in detail with reference to the Figures.

Figure 1:
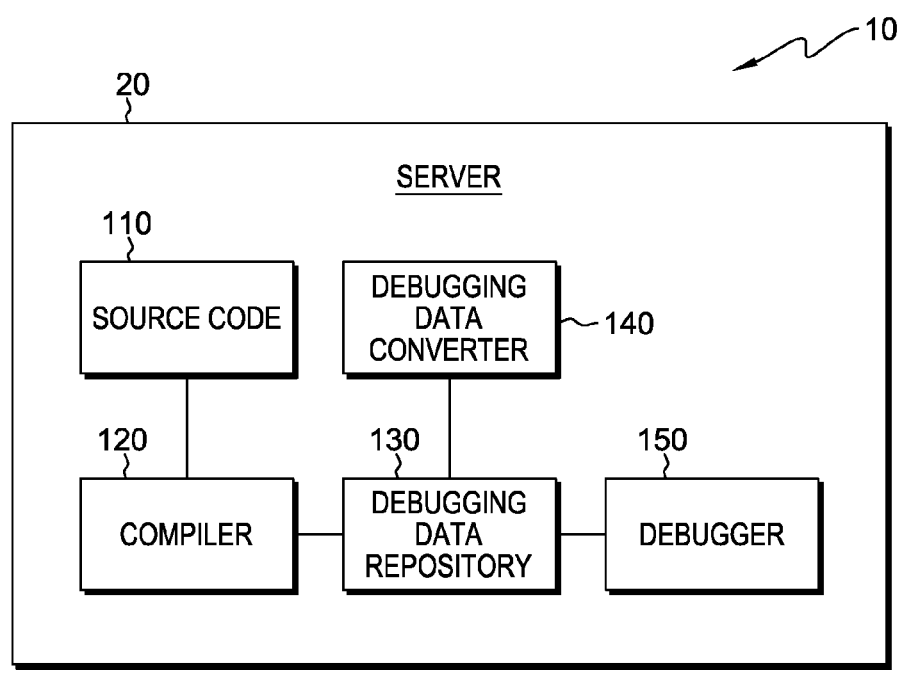
FIG. 1 depicts a diagram of a computing system, in accordance with one embodiment of the present invention

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 20. Computing system 10 may also include a network, servers, computing devices, or other devices not shown.

Server 20 may be a management server, a web server, or any other electronic device or computing system capable of processing program instructions and receiving and sending data. In some embodiments, server 20 may be a laptop computer, tablet computer, netbook computer, personal computer (PC), a desktop computer, a personal digital assistant (PDA), a smart phone, or any programmable electronic device. In other embodiments, server 20 may represent a server computing system utilizing multiple computers as a server system, such as in a cloud computing environment. Server 20 contains source code 110, compiler 120, debugging data repository 130, debugging data converter 140, and debugger 150. Server 20 may include components, as depicted and described in further detail with respect to FIG. 3.

Source code 110 is a generic set of source code to be compiled by compiler 120. Embodiments of source code 110 may be written in COBOL, C++, Smalltalk, or other programming languages. In some embodiments, source code 110 resides on server 20. In other embodiments, source code 110 may reside on another server or another computing device, provided that source code 110 is accessible to compiler 120.

Compiler 120 is a compiler that generates DWARF debugging data during the compilation of source code, such as source code 110. A compiler transforms source code written in a programming language, i.e., the source language, into another computer language, i.e., the target language, which is often object code. In some embodiments, compiler 120 stores DWARF debugging data to a repository, such as debugging data repository 130, for access by debugging data converter 140. In some embodiments, compiler 120 is a function of an integrated development environment (IDE). In other embodiments, compiler 120 is a stand-alone compiler. An IDE is a software application that provides comprehensive facilities to computer programmers for software development, such as source code editors, build automation tools, compilers, interpreters, debuggers, etc. In one embodiment, compiler 120 resides on server 20. In another embodiment, compiler 120 may reside on another server or another computing device, provided that compiler 120 has access to source code 110 and debugging data repository 130.

Debugging data repository 130 may be a repository that may be written and read by compiler 120, debugging data converter 140, and debugger 150. DWARF debugging data and converted debugging data may be stored to debugging data repository 130. In some embodiments, converted debugging data may be annotated to indicate corresponding DWARF debugging data. In one embodiment, debugging data repository 130 resides on server 20. In other embodiments, debugging data repository 130 may reside on another server or another computing device, provided that debugging data repository is accessible to compiler 120, debugging data converter 140, and debugger 150.

Debugging data converter 140 operates to convert DWARF debugging data into a compiler listing, such that a debugger that does not support the DWARF format, such as debugger 150, extracts debugging information from the compiler listing. A compiler listing may include the following information: assigned offsets into the object program for each source line, in order to determine which source line is being executed when the program malfunctions; a symbol table that includes information about variable declarations and assigned addresses in storage for variables; and cross-reference information that includes information indicating which variable(s) are referenced on each source line. In some embodiments, debugging data converter 140 converts DWARF debugging data into a compiler listing that is human-readable. Debugging data converter 140 may store the generated compiler listing to a repository, such as debugging data repository 130. In one embodiment, debugging data converter 140 resides on server 20. In another embodiment, debugging data converter 140 may reside on another server or another computing device, provided that debugging data converter 140 has access to debugging data repository 130.

Debugger 150 is a debugger that does not support the DWARF debugging data format. In embodiments of the present invention, debugger 150 supports the compiler listing generated by debugging data converter 140. A debugger is used to test and debug other programs. In one embodiment, debugger 150 resides on server 20. In another embodiment, debugger 150 may reside on another server or another computing device, provided that debugger 150 has access to debugging data repository 130.

Figure 2:
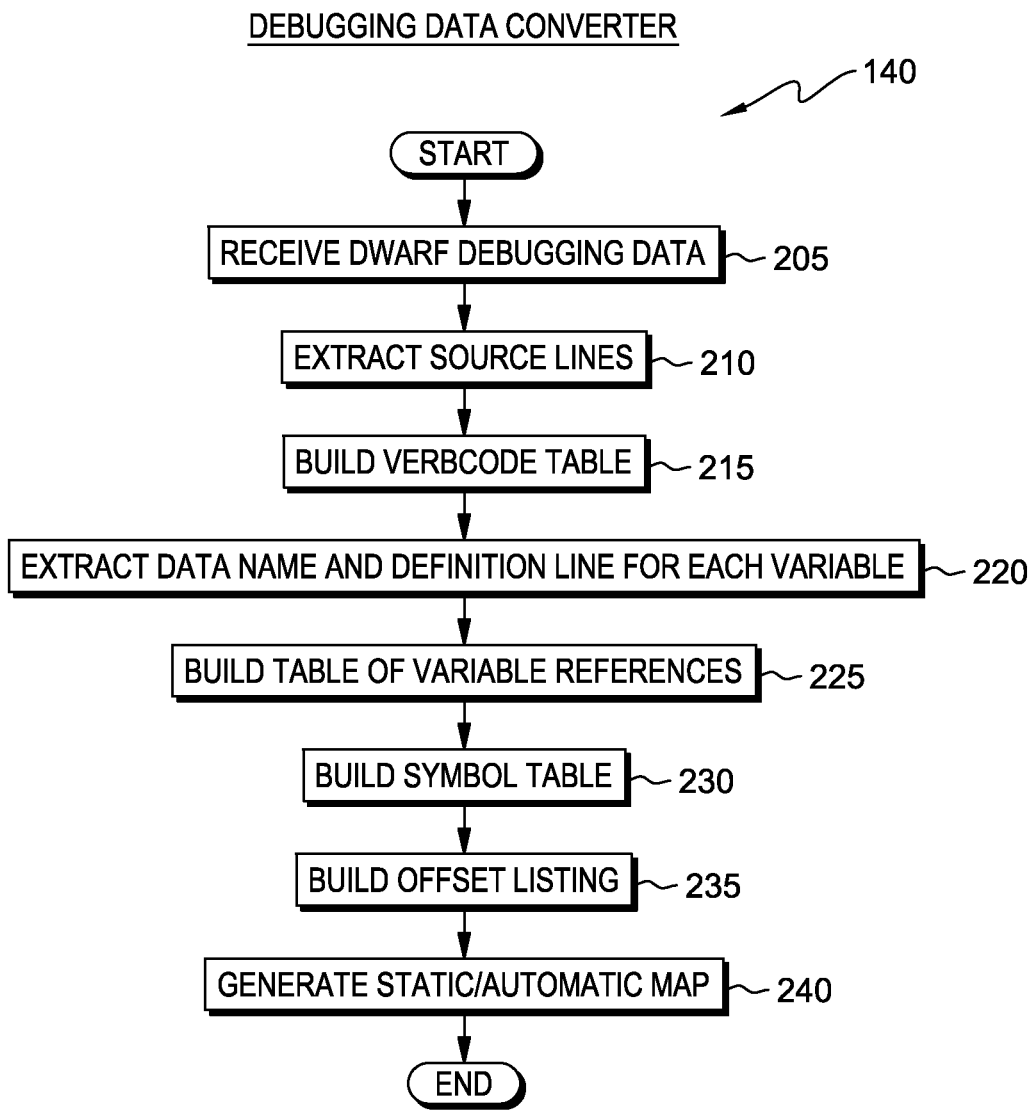
FIG. 2 depicts a flowchart of the steps of a debugging data converter executing within the computing system of FIG. 1, for converting DWARF debugging data into a compiler listing format, in accordance with one embodiment of the present invention.

FIG. 2 depicts a flowchart of the steps of debugging data converter 140 executing within the computing system of FIG. 1, in accordance with an embodiment of the present invention. Debugging data converter 140 operates to receive DWARF debugging data, generated by compiler 120 using source code 110, and convert it into a compiler listing format, such that a debugger incompatible with the DWARF format, such as debugger 150, may consume the compiler listing provide source-level debugging of source code 110.

In one embodiment, initially, a user may write source code, such as source code 110. Source code 110 may be any generic source code written in any one of a number of computer programming languages, such as C++, Smalltalk, or COBOL. Source code 110 may be compiled by compiler 120. Compiler 120 may be any compiler capable of generating DWARF debugging data during compilation of source code 110. In some embodiments, compiler 120 may store generated DWARF data to a repository, such as debugging data repository 130.

In step 205, debugging data converter 140 receives DWARF debugging data. In some embodiments, debugging data converter 140 receives DWARF debugging data from a compiler, such as compiler 120. In other embodiments, debugging data converter 140 accesses and retrieves DWARF debugging data from a repository, such as debugging data repository 130. In still other embodiments, debugging data converter 140 is a function of debugger 150, such that debugging data converter 140 can convert DWARF debugging data into a debugging data format debugger 150 can comprehend.

In step 210, debugging data converter 140 extracts source lines from the DWARF debugging data. DWARF debugging data is organized into blocks. Each block may contain information related to one or more source lines of source code 110. In some embodiments, debugging data converter 140 extracts each source line from each block and assigns each extracted source line a sequential line number. In some embodiments, debugging data converter 140 differentiates line numbers via a newline character. A newline character is a special character or sequence of characters signifying the end of a line of text. In some embodiments, debugging data converter 140 uses an application programming interface (API) to extract each source line. An API is a set of routines, protocols, and tools for building software applications by specifying how software components should interact. In some embodiments, APIs used by debugging data converter 140 are published as an open standard for UNIX®.

In step 215, debugging data converter 140 builds a verbcode table. A verbcode table is a table including each verb associated with source code 110, as deciphered from the DWARF debugging data, along with one or more reference lines associated with each respective verb. A verb, in the present context, is a grammatical verb indicating an action to be taken within the computing language. For example, IF, ADD, READ, WRITE, are each verbs. In some embodiments, the verbcode table is organized alphabetically according to verb. In other embodiments, the verbcode table may be organized in another manner.

In step 220, debugging data converter 140 extracts the data name and definition line, for each variable of source code 110, from the DWARF debugging data. DWARF debugging data comprises multiple debugging information entries (DIEs). Each DIE has a tag, which specifies what the DIE describes and a list of attributes, which fill in details and further describes the entity. DIE attributes may contain a variety of values such as constants (such as a function name), variables (such as the start address for a function), or references to another DIE (such as for the type of a function's return value). In some embodiments, debugging data converter 140 accesses each variable DIE (i.e., DW_TAG_variable) and retrieves, from each variable DIE, the respective definition line, or declaration line, and data name of the variable. In some embodiments, the declaration line is an attribute, included within the field DW_AT_decl_line, and the data name is an attribute included within the field DW_AT_name. In some embodiments, debugging data converter 140 may extract data name and definition line information for each variable through the use of one or more APIs.

In step 225, debugging data converter 140 builds a table of references. In embodiments of the present invention, debugging data converter 140 initially builds a reference list by accessing applicable information stored within the DWARF debugging data. In embodiments of the present invention, a reference list includes each variable, along with each respective line, of source code 110 within which the variable is referenced. In some embodiments, debugging data converter 140 may further identify source fragments which locate the parts of the source line that reference each particular variable. The DIE for a variable may include a DIE attribute indicating a list of source coordinates (i.e., row, column) where the variable is referenced. Debugging data converter 140 may use an identified row to identify a line of source code where the variable is referenced. In some embodiments, debugging data converter 140 may use a column as a parsing start position, if further info regarding the variable's use was needed.

Using the retrieved source fragments, debugging data converter 140 may create a table to facilitate locating a fragment according to variable name. Debugging data converter 140 may additionally determine whether each variable referenced in each source fragment is modified. Using the source coordinates where the variable is referenced, debugging data converter 140 can access the source fragments for the variable. Data debugging converter 140 can match the row and variable name to an indicated DIE location at an offset, where a DIE attribute indicates whether the variable in question is modified. This process can be used for each location the variable is referenced. In some embodiments, if debugging data converter 140 determines that a variable referenced in a source fragment is modified, debugging data converter 140 annotates the reference line of the source fragment within the table of variable references to indicate a location where the variable may be modified. In some embodiments, the annotation is an "M" in from of the reference line. In some embodiments, debugging data converter 140 may determine the location in which each variable is referenced in source code 110, and whether or not the source code line modifies the each respective variable, using one or more APIs.

In step 230, debugging data converter 140 builds a symbol table. In embodiments of the present invention, a symbol table includes information such as data names and associated structure hierarchy information, base locator information, and/or assembler data definition information. In some embodiments, debugging data converter 140 retrieves a list of variables and associated structure hierarchy for each variable. Debugging data converter 140 may determine variable structure hierarchy by accessing children or sibling DIEs related to a base DIE. In some embodiments, debugging data converter 140 may further collect base type info used to formulate a declaration or definition. A base type is the type of a unit of data, such as an array. In some embodiments, for example when source code 110 was written in the COBOL programming language, debugging data converter 140 extract information, such as base locator information, from the DWARF debugging data that relates to the data division section of the COBOL program. The data division is the part of a COBOL program in which the format and layout of external files and databases, and internally-used variables and constants are defined. In some embodiments, debugging data converter 140 further accesses a location list of addressing expressions within the DWARF debugging data, and processes the expressions to determine an offset of the respective variable or structure member. In some embodiments, debugging data converter 140 accesses information necessary to build the symbol table using one or more APIs.

In step 235, debugging data converter 140 builds an offset listing from information retrieved from the DWARF debugging data. An offset listing includes verbs, such as the verbs discussed in reference to step 215, along with the line number from the source code and the line offset value. The line offset value indicates the offset, from the start of the program (i.e., source code 110), of the code generated for the respective verb. In some embodiments, the offset value will be in hexadecimal notation. In some embodiments, debugging data converter 140 may gather line number information and line offset information using one or more APIs.

In step 240, debugging data converter 140 generates a static and/or automatic map using information extracted from the DWARF debugging data. Each map may provide variable addressing. A static map lists all static variables and is sorted by hexadecimal offset. An automatic map lists, for each block of the DWARF debugging data, all automatic variables sorted by hex offset. In some embodiments, debugging data converter 140 may gather offset information using one or more APIs, and information from the generated symbol table.

Figure 3:
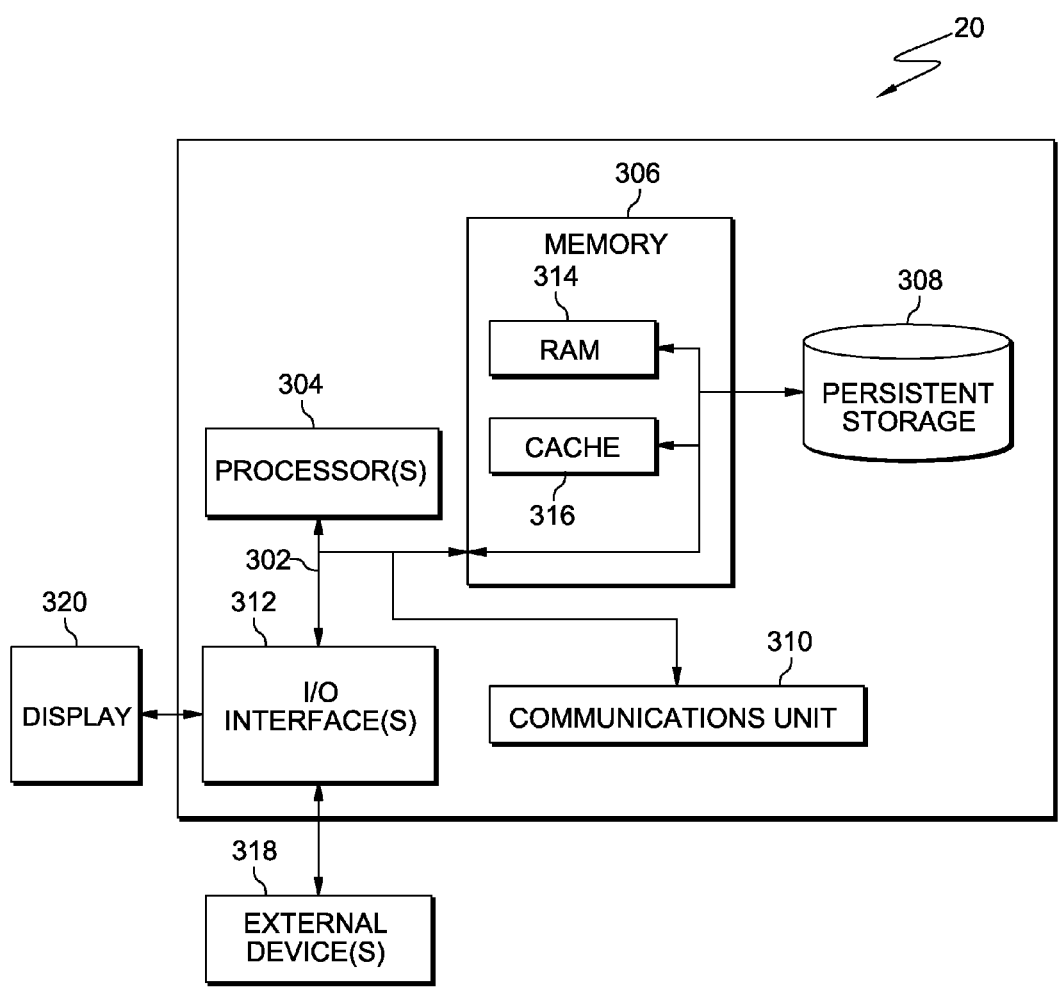
FIG. 3 depicts a block diagram of components of the server executing a debugging data converter, in accordance with one embodiment of the present invention.

FIG. 3 depicts a block diagram of components of server 20 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 20 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Source code 110, compiler 120, debugging data repository 130, debugging data converter 140, and debugger 150 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Source code 110, compiler 120, debugging data repository, debugging data converter 140, and debugger 150 may be downloaded to persistent storage 308 through communications unit 310.

I/O interface(s) 312 allows for input and output of data with other devices that may be connected to server 20. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., source code 110, compiler 120, debugging data repository 130, debugging data converter 140, and debugger 150, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for generating a compiler listing using Debugging With Attributed Record Format (DWARF) debugging data, the computer program product comprising:
    one or more computer readable storage memories and program instructions stored on the one or more computer readable storage memories, the program instructions comprising:
    program instructions to receive DWARF debugging data associated with source code of a programming language;
    program instructions to access a debugging information entry (DIE) of the DWARF debugging data;
    program instructions to retrieve a variable declaration line and a variable data name for a variable from the DIE;
    program instructions to identify a line of the source code that references the variable;
    program instructions to determine the line of the source code modifies the variable;
    program instructions to generate a compiler listing based on the information extracted from the DWARF debugging data, wherein the compiler listing includes at least a symbol table, and cross-reference information; and
    program instructions to annotate a reference to the line of the source code within the compiler listing, indicating that the variable is modified at the line of the source code.

2. The computer program product of claim 1, wherein program instructions to receive DWARF debugging data associated with source code of a programming language comprise:
    program instructions to receive the source code;
    program instructions to compile the source code; and
    program instructions to generate the DWARF debugging data.

3. The computer program product of claim 1, wherein the cross-reference information comprises a listing of variables and source lines where each variable of the listing is referenced.

4. The computer program product of claim 1, wherein the symbol table includes variable names, base locator information, and assembler data definition information.

5. The computer program product of claim 1, further comprising:
    program instructions, stored on the one or more computer readable storage memories, to consume, by a debugger incompatible with DWARF debugging data, at least the compiler listing.

6. The computer program product of claim 1, wherein the programming language is COBOL.

7. A computer system for generating a compiler listing using Debugging With Attributed Record Format (DWARF) debugging data, the computer system comprising:
    one or more computer processors, one or more computer readable storage media, and program instructions stored on the computer readable storage media for execution by at least one of the one or more processors, the program instructions comprising:
    program instructions to receive DWARF debugging data associated with source code of a programming language;
    program instructions to access a debugging information entry (DIE) of the DWARF debugging data;
    program instructions to retrieve a variable declaration line and a variable data name for a variable from the DIE;
    program instructions to identify a line of the source code that references the variable;
    program instructions to determine the line of the source code modifies the variable;
    program instructions to generate a compiler listing based on the information extracted from the DWARF debugging data, wherein the compiler listing includes at least a symbol table, and cross-reference information; and
    program instructions to annotate a reference to the line of the source code within the compiler listing, indicating that the variable is modified at the line of the source code.

8. The computer system of claim 7, wherein program instructions to receive DWARF debugging data associated with source code of a programming language comprise:
    program instructions to receive the source code;
    program instructions to compile the source code; and
    program instructions to generate the DWARF debugging data.

9. The computer system of claim 7, wherein the cross-reference information comprises a listing of variables and source lines where each variable of the listing is referenced.

10. The computer system of claim 7, wherein the symbol table includes variable names, base locator information, and assembler data definition information.

11. The computer system of claim 7, further comprising:
    program instructions, stored on the computer readable storage media for execution by at least one of the one or more processors, to consume, by a debugger incompatible with DWARF debugging data, at least the compiler listing.

* * * * *